June 3, 1941.  J. A. CROWLEY, JR  2,244,612
CONTACT CATALYTIC PROCESS
Filed Feb. 10, 1939
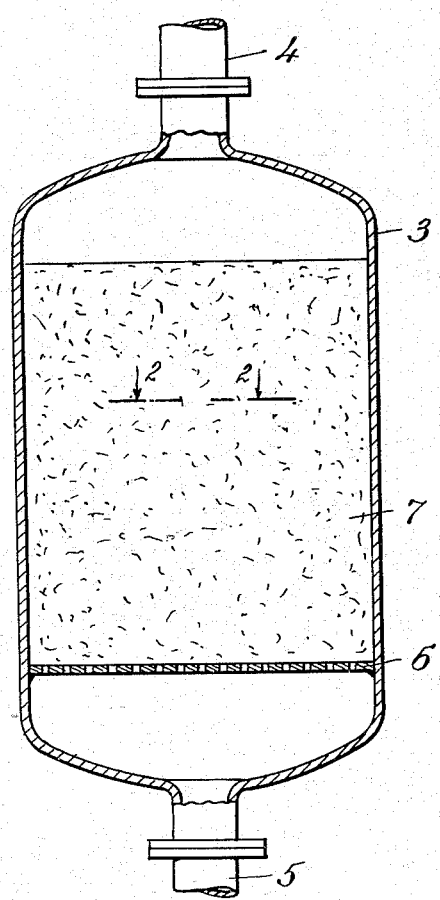
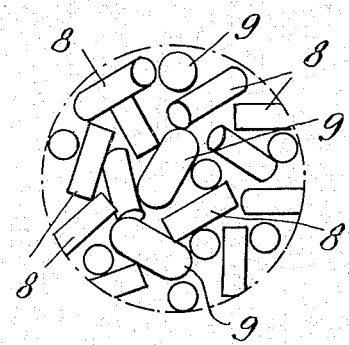
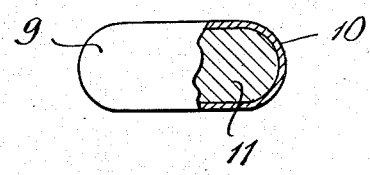
John A. Crowley, Jr.
INVENTOR
BY Myron J. Hubbard
ATTORNEY Patented June 3, 1941

2,244,612

UNITED STATES PATENT OFFICE 2,244,612

CONTACT CATALYTIC PROCESS

John A. Crowley, Jr., Woodbury, N. J., assignor to Socony-Vacuum Oil Company, Incorporated, New York, N. Y., a corporation of New York Application February 10, 1939, Serial No. 255,785

5 Claims. (Cl. 196—52)

This invention is directed to operations wherein conversions of materials are effected in the presence of a contact mass. Typical of such operations are those wherein hydrocarbons are converted to other hydrocarbons of different boiling point by reaction at elevated temperature in the presence of a contact mass which may be possessed of catalytic properties for the reaction or which may support a catalyst upon or within its particles, or which may merely assist in the reaction by furnishing physical conditions proper for its accomplishment. Such reactions usually result in a deposit of carbon, coke, tar, or other combustible carbonaceous material upon or within the contact mass. Consequently the regeneration of the contact mass by burning off of the deposit appears as a part of a complete process of this nature. The regenerative burning is exothermic, and the primary reaction is usually endothermic, although not always. This invention is directed specifically to the conduct of such a unitary process consisting of a reaction, which may be endothermic, in the presence of a contact mass, followed by an exothermic regeneration of said contact mass. Contact masses appropriate for such reactions are normally susceptible to damage by exposure to high temperatures and cyclic processes contemplating regeneration must provide means for protecting the catalytic contact mass from such damaging temperatures.

This invention has for its principal object the provision of a process of the kind mentioned wherein the contact mass which is susceptible to temperature damage is admixed with a material of relatively high heat absorptive capacity, enabling the entire mixture to absorb a substantial amount of heat during exothermic periods. An important object is the provision of such a process wherein the temperature-susceptible contact mass is capable of being afforded substantial protection against elevated temperatures. An important object is the provision of methods of operating in the presence of such a highly heat absorptive contact mass mixture.

As exemplary of reactions wherein the present invention will be found useful there may be mentioned the conversion, decomposition, synthesis or transformation of hydrocarbons and their derivatives, the purification of gases and vapors, and other reactions. Most typical applications are to the refining, cracking, polymerization, decomposition, molecular rearrangement or partial combustion of hydrocarbons or similar material derived from petroleum, coal, shale, etc., or derived by synthesis from non-hydrocarbon reactants. Without being limited thereto or thereby, the vapor phase cracking of high boiling hydrocarbons to hydrocarbons of gasoline boiling range will hereinafter be used in an exemplary manner as a typical reaction. Typical contact masses for reactions of the type indicated consist usually of a porous refractory adsorbent material in granular or pellet form which may itself be capable of promoting the desired reaction or which may carry a catalytic material upon or within its body. A practical and typical catalyst used in hydrocarbon conversion consists of material of clay-like nature in the form of rods or pellets, usually about 2½ mm. in diameter and about 2½ mm. long. This material is degraded or lessened in activity by prolonged exposure to high temperatures of the order of 1100° F. and upwards. Other materials degrade similarly, though possibly at different temperatures.

In a typical process of the presently used type for hydrocarbon conversion a gas oil fraction heated to about 875° F. is passed through such a contact mass. After a period upon reaction, the passage of reactant is stopped, there having been about ¼% to 3% of combustible carbonaceous material deposited upon the contact mass. The contact mass is then regenerated by blowing with preheated air during which period the carbonaceous material is burned at temperatures ranging from 875° F. upwards to 1100° F. Control of these temperatures during the exothermic regeneration according to present practise is obtained by providing tubes embedded in the contact mass through which a heat transfer medium is circulated to carry away the heat. To permit of so controlling the heating due to regeneration, the catalyst is placed within a chamber through which there extends a series of tubes and to permit efficient flow of heat from the catalyst or contact mass into the heat transfer medium contained in those tubes, the tubes are equipped with fins extending into the space occupied by the contact mass. Such construction is costly and may be difficult of maintenance. So far as I know operations of the type above described represent the best type of operations yet developed.

The present invention contemplates the use of a reaction space packing which is composed of the usual contact mass and in addition thereto a sufficient amount of another material having a high heat absorptive capacity at a relatively narrow temperature level so that the whole packing material is capable of absorbing a relatively high amount of heat at temperature levels near the desired operating level.

This invention is based upon the discovery that there may be admixed with the contact mass metallic capsules containing some material, such as a fusible inorganic salt or a fusible metal alloy, capable of absorbing a large amount of latent heat of fusion at a level slightly above the reaction temperature and below the temperature at which the contact mass may be damaged during an exothermic regeneration.

To more clearly understand this invention, reference is now made to the drawing attached hereto, in which drawing Figure 1 depicts an apparatus for catalytic treatment, Figure 2 an enlarged view of a portion of the packing therein, and Figure 3 an enlarged view of a heat absorptive packing element. In Figure 1, a chamber 3, provided with a reactant fluid inlet 4 and outlet 5, has an internally mounted apertured support plate 6, upon which there is placed a packing material 7. Turning to Figure 2, we find this packing material to be composed in part of contact mass particles 8 and in part of heat adsorptive bodies 9. In Figure 3 we find the heat adsorptive bodies 9 to be comprised of a metal shell 10 within which there is enclosed some material, as herein described, capable of adsorbing a relatively great amount of heat at a relatively constant temperature level. It will be understood, of course, that the reaction chamber, the relative size and shape of the contact mass particles, the material of which they are made, the relative size and shape of the heat adsorptive particle, and the materials assembled therein are all matters capable of considerable variation without departing from the spirit of this invention, the showing made hereby being diagrammatic and exemplary only.

The use of such a heat absorptive material may give a greatly enhanced heat absorptive capacity to the reaction space packing. Conversely, a lesser amount of inert heat absorptive material can be used to confer a given heat absorptive capacity to a reaction space packing, thus allowing a greater percentage of the packing to be reactive material and securing greater yields per unit of reaction space volume.

Of particular interest is the fact that since such heat absorptive additives absorb and emit heat at relatively constant temperature levels, a particularly desirable form of control is thus made available for alternately exothermic and endothermic operations.

The selection of the fusible material depends upon the temperature level of the reaction involved. It should be one capable of absorbing latent heat of fusion at a temperature level above that of the reaction and below a temperature damaging to the contact mass used. Preferably it should be one capable of absorbing a considerable amount of heat at a temperature level not far above the optimum temperature of the reaction being conducted. Again referring, for exemplary purposes, to hydrocarbon cracking at temperatures of 850–875° F. in the presence of a clay-like contact mass susceptible to damage at temperatures of 1100° F. and upwards, the following materials exhibit properties enabling their use at these temperature levels.

I. Inorganic salts

Lithium halides, particularly bromide and iodide, lead chloride, cupric bromide and chloride.

II. Fusible alloys

| Alloy: | Melting point, °F. |
|---|---|
| 80% Pb+20% Na | 788 |
| Zn | 788 |
| 90% Zn+10% Al | 797 |
| 70% Zn+30% Al | 950 |
| 80% Bi+20% Sb | 761 |
| 70% Bi+30% Sb | 878 |
| 60% Bi+40% Sb | 968 |
| 90% Zn+10% Sb | 878 |
| 40% Pb+60% Sb | 914 |

The material selected may be enclosed in a capsule of a suitable metal, substantially inert to the fusible material used and substantially inert to the reaction materials present. For most purposes, a ferrous metal capsule may be used.

The amount to be added depends upon the amount of heat to be absorbed, and may be readily calculated from known data. As an upper limit, and in most cases as a working lower limit, the amount to be added should be such that the exothermic heat of regeneration may be absorbed by the reaction space packing mixture without permitting rise of temperature therein to levels damaging to the catalytic contact mass.

In addition to the fusible materials herein noted as being useful in this method of control, other types of substances capable of absorbing a relatively large amount of heat in a relatively narrow temperature range will be found useful. For example materials which absorb latent heat of vaporization in some manner which does not give rise to unduly high vapor pressures at the temperature levels encountered may be used, as for instance, some materials which sublime at appropriate temperature levels will be found useful. Also it is entirely within the scope of my invention to make use of materials or mixtures of materials capable of entering into reversible chemical reactions involving heat intake at suitable temperatures.

As exemplary of materials capable of subliming at appropriate temperature levels there may be mentioned ammonium bromide, ammonium iodide, and mercuric chloride which sublime at temperatures respectively of 1005° F., 1025° F., and 1075° F. and would be useful where an exothermic reaction is to be held around 1000° F. to 1100° F.

As an example of a reversible reaction system, there may be noted the reaction HI⇌½I₂+½H₂ which upon a temperature increase from 825° F. to 1075° F., shifts to the right with absorption of about 2000 calories per gram mol of HI originally present.

I claim:

1. In a process involving an exothermic reaction in the presence of a contact mass normally susceptible to damage by heating to a high temperature the method of controlling the rise of temperature during the exothermic reaction which comprises maintaining a heat absorptive material in admixture with the contact mass in sufficient quantity to absorb the exothermic heat of reaction without permitting rise of temperature to levels sufficiently high to damage the contact mass, the heat absorptive material being capsules containing a substance capable of absorbing a substantial amount of heat at a relatively narrow temperature level between that at which the reaction may progress and one at which the contact mass may be damaged.

2. In a cyclic process involving an exothermic reaction in the presence of a contact mass and a second non-exothermic reaction in the presence of the same contact mass, the method of controlling the variations of temperature of the contact mass during reactions which comprises maintaining a heat absorptive material in admixture with the contact mass in sufficient quantity to absorb the exothermic heat involved without undue rise in temperature and extracting heat from said heat absorptive material during the non-exothermic reaction, the heat absorptive material being capsules containing a fusible substance capable of absorbing latent heat at a temperature level above that of the non-exothermic reaction.

3. A cyclic process for the conversion of hydrocarbons comprising passing hydrocarbon material at conversion temperature through a contact mass composed in part of catalytic material and in part of heat absorptive material, depositing a controlled amount of combustible contaminant upon said contact mass during reaction, and subsequently regenerating said contact mass by a combustion of said controlled amount of contaminant, the exothermic heat of combustion of which would be sufficient, in the absence of heat absorptive material, to raise the temperature of the system to levels damaging to said catalytic material, in which the amount of heat absorptive material, in relation to the controlled contaminant deposit, is sufficient substantially to prevent rise of temperatures during regeneration to damaging levels, and in which the heat absorptive material comprises capsule formed, metal-enclosed portions of fusible material capable of absorbing latent heat of fusion at a temperature above that of the reaction and below that damaging to the catalyst.

4. A packing material for use in exothermic reactions conducted in the presence of a catalytic contact mass comprising catalytic contact mass material and closed metallic capsules, said capsules being embedded in and distributed at random throughout said contact mass, said capsules being of a size sufficiently small to permit of substantially uniform random distribution in said contact mass, said capsules containing fusible material capable of absorbing latent heat of fusion at the temperature level of the exothermic reaction, and said capsules being present in sufficient amount to prevent rise of the temperature to levels damaging to the catalytic contact material.

5. A packing material for use in exothermic reactions conducted in the presence of a catalytic contact mass comprising catalytic contact mass material and closed metallic capsules, said capsules being embedded in and distributed at random throughout said contact mass, said capsules being of a size sufficiently small to permit of substantially uniform random distribution in said contact mass, said capsules containing fusible material capable of absorbing latent heat of fusion at the temperature level of the exothermic reaction, and said capsules being present in sufficient amount to absorb a substantial portion of the exothermic heat evolved during reaction.

JOHN A. CROWLEY, Jr.